(12) United States Patent
Mauer

(10) Patent No.: US 6,910,056 B1
(45) Date of Patent: Jun. 21, 2005

(54) METHOD AND APPARATUS FOR IMPLEMENTING A MULTI-STEP PSEUDO RANDOM SEQUENCE GENERATOR

(75) Inventor: Volker Mauer, High Wycombe Bucks (GB)

(73) Assignee: Altera Corporation, San Jose, CA (US)

( * ) Notice: Subject to any disclaimer, the term of this patent is extended or adjusted under 35 U.S.C. 154(b) by 642 days.

(21) Appl. No.: 09/924,675

(22) Filed: Aug. 8, 2001

Related U.S. Application Data

(60) Provisional application No. 60/264,798, filed on Jan. 29, 2001.

(51) Int. Cl.[7] ................................................. G06F 1/02
(52) U.S. Cl. ....................................................... 708/250
(58) Field of Search ................................ 7082/25–253, 7082/256

(56) References Cited

U.S. PATENT DOCUMENTS 6,038,577 A * 3/2000 Burshtein .................... 708/252
6,643,740 B1 * 11/2003 Auracher ..................... 711/133

* cited by examiner

*Primary Examiner*—Tan V. Mai
(74) *Attorney, Agent, or Firm*—L. Cho

(57) ABSTRACT

A method for implementing a pseudo random sequence (PRS) generator is disclosed. Relationships between outputs of flip-flops of an initial model PRS generator at a current time step t with the outputs of the flip-flops at a time step t-n is determined, where n is a number of coefficients to be generated per time step. Flip-flops in the multi-step PRS generator are coupled in response to the relationships between the outputs of the flip-flops at the current time step t with the output of the flip-flops at the time step t-n.

23 Claims, 6 Drawing Sheets

US 6,910,056 B1

METHOD AND APPARATUS FOR IMPLEMENTING A MULTI-STEP PSEUDO RANDOM SEQUENCE GENERATOR

RELATED APPLICATIONS

This application claims the priority date of provisional patent application 60/264,798 filed on Jan. 29, 2001.

FIELD OF THE INVENTION

The present invention relates to the field of pseudo random sequence generators. More specifically, the present invention relates to linear feedback shift registers for generating pseudo random sequences.

BACKGROUND

Code Division Multiple Access (CDMA) and Wideband Code Division Multiple Access (W-CDMA) are wireless communication standards. In CDMA and W-CDMA, a single frequency spectrum is shared by multiple users. In order to distinguish one wireless communication device from another, a unique code sequence is associated with each wireless communication device. The wireless communication devices may identify code sequences embedded in transmitted signal samples and identify an amount of delay incurred for the transmission of signal samples between wireless communication devices using the code sequences.

In the past, there were a number of approaches available that allowed wireless communication devices to access its code sequences. A first approach involved storing a complete code:sequence in storage elements. However, when the length of a code sequence was large, this approach required a large number of storage elements. This translated into additional cost and space requirements, which were undesirable. A second approach involved generating code sequences dynamically using a pseudo random sequence generator such as a linear feedback shift register. Although pseudo random sequence generators provided a more cost and space efficient alternative to accessing code sequences, pseudo random sequence generators of the past suffered the drawback of producing a limited number of coefficients during a time period. A typical linear feedback shift register produces only one new value during each time step. If times shifted versions are desired, several linear feedback shift registers (LFSR) needed to be implemented and started at different times. Consequently, the amount of hardware resources needed for the linear feedback shift registers increased linearly with the number of multiply and accumulate operations that are implemented in parallel.

Thus, what is needed is a method and apparatus for accessing pseudo random sequences that is efficient and cost effective.

SUMMARY

A method for implementing a multi-step pseudo random sequence (PRS) generator is disclosed according to a first embodiment of the present invention. Relationships between outputs of flip-flops of an initial model PRS generator at a current time step t with the outputs of the flip-flops at a time step t-n are determined, where n is a number of coefficients to be generated per time step. Flip-flops of the multi-step PRS generator are coupled in response to the relationships between the outputs of the flip-flops at the current time step t with the output of the flip-flops at the time step t-n.

A method for implementing a multi-step PRS generator is disclosed according to a second embodiment of the present invention. A number of flip-flops for an initial model PRS generator, L, is selected based on a length of the code sequence and a number of coefficients of the code sequence to be generated per time step. A generator polynomial for the initial model PRS generator is selected. Relationships between outputs of the flip-flops at a current time step t with the output of the flip-flops at a time step t-1 are determined. Relationships between the output the flip-flops at the time step t-1 with the output of the flip-flops at a time step t-2 are determined. Relationships between the outputs of the flip-flops at the current time step t with the outputs of the flip-flops at the time step t-2 are determined. Flip-flops in the multi-step PRS generator are coupled in response to the relationships between the output of the flip-flops at the current time step t with the output of the flip-flops at the time step t-2.

A multi-step pseudo random sequence (PRS) generator is disclosed according to an embodiment of the present invention. The multi-step PRS generator includes a first flip-flop having an output $Q_{0,u}$ and a generator polynomial $G_0$, a second flip-flop having an output $Q_{1,u}$ and a generator polynomial $G_1$, a third flip-flop having an output $Q_{2,u}$ and a generator polynomial $G_2$, and a fourth flip-flop having an output $Q_{3,u}$ and a generator polynomial $G_3$. The multi-step PRS generator includes an input of the first flip-flop coupled the PRS generator such that the output $Q_{0,u}$ is generated in response to $G0*[G_0*Q_{0,u-1}$ XOR $G_1*Q_{1,u-1}$ XOR $G_2*Q_{2,u-1}$ XOR $G_3*Q_{3,u-1}]$ XOR $G_1*Q_{0,u-1}$ XOR $G_2*Q_{1,u-1}$ XOR $G_3*Q_{2,u-1}$. The multi-step PRS generator includes an input to the second flip-flop coupled to the PRS generator such that the output $Q_{1,u}$ is generated in response to $G_0*Q_{0,u-1}$ XOR $G_1*Q_{1,u-1}$ XOR $G_2*Q_{2,u-1}$ XOR $G_3*Q_{3,u-1}$. The multi-step PRS generator includes an input to the third flip-flop coupled to the PRS generator such that the output $Q_{2,u}$ is generated in response to $Q_{0,u-1}$.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily.

Figure 1:
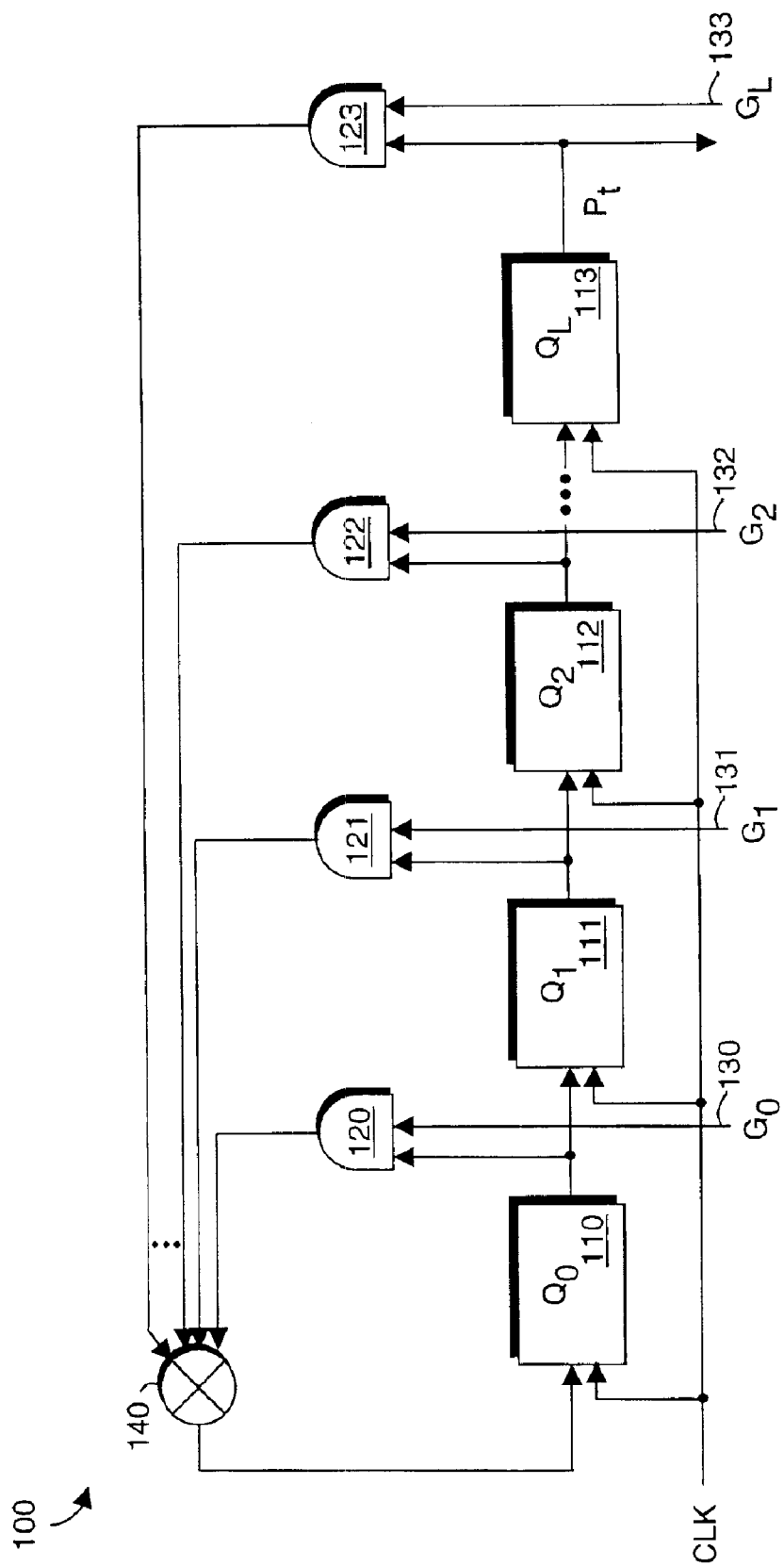
FIG. 1 is a block diagram illustrating an initial model pseudo random sequence generator according to an embodiment of the present invention.

FIG. 1 illustrates a block diagram of an initial model pseudo random sequence (PRS) generator 100 according to an embodiment of the present invention. The initial model PRS generator 100 is an initial model that may be used to design a multi-step PRS generator. The initial model PRS generator 100 includes a plurality of L memory elements driven by a clock signal where L may be any number. In this example, block 110 represents a first memory element, block 111 represents a second memory element, block 112 represents a third memory element, and block 113 represents an Lth memory elements where L is 4. Memory elements 110–113 are given a designation where memory element 110 represents a highest order memory element and memory element 113 represents a lowest order memory element. According to an embodiment of the initial model PRS generator 100, each of the memory elements 110–113 may be implemented using a flip-flop. Each flip-flop, with the exception of the lowest order flip-flop, outputs its content to a next lower order flip-flop during each time step.

The initial model PRS generator 100 includes a plurality of L input lines that correspond to each of the L flip-flops. Input line 130 corresponds to flip-flop 110. Input line 131 corresponds to flip-flop 111. Input line 132 corresponds to flip-flop 112. Input line 133 corresponds to flip-flop 113. Each of the input lines 130–133 generates either a high signal or a low signal depending on a polynomial G assigned to it. Each flip-flop and its corresponding input line is coupled to a circuit that performs an AND function. Flip-flop 110 and input line 130 is coupled to circuit 120 that performs an AND function. Flip-flop 111 and input line 131 is coupled to circuit 121 that performs an AND function. Flip-flop 112 and input line 132 is coupled to circuit 122 that performs an AND function. Flip-flop 113 and input line 133 is coupled to circuit 123 that performs an AND function. The initial model PRS generator 100 includes a circuit 140 that performs an XOR function. The circuit 140 is coupled to circuits 120–23 and performs an XOR function on the outputs of circuits 120–123. The output of circuit 140 is transmitted to the highest order flip-flop 110.

Pseudo random sequences may be generated by the initial model PRS generator 100 at the output of flip-flop 113. A feedback may be chosen such that a maximum length sequence p(t) is generated which includes n=$2^L$−1 bits. The polynomial G defines which outputs of the flip-flops 130–133 are combined in the feedback. Each time step, a new value p(t) is produced. These sequences may be used in a CDMA system to spread a binary sequence $b_i$ with elements {0,1} into a corresponding sequence $s_i(t)=(2b_i-1)$ p(t−iT), where $s_i(t)$ is the pulse corresponding to the element $b_i$ in the sequence with elements {0,1}. Equivalently, the binary sequence $b_i$ with elements {0,1} may be mapped into a corresponding bipolar pseudo random sequence $s_i$ with elements {−1,1}.

In this example, the initial model PRS generator 100 is shown to have 4 flip-flops. It should be appreciated that any number of flip-flops may be implemented. The number of flip-flops in the initial model PRS generator 100, L, determines the maximum length of the pseudo random sequence and a maximum number of values per time step a multi-step PRS generator designed from the initial model PRS generator 100 may generate.

According to an embodiment of the present invention, a multi-step PRS generator may be designed such that a selected number of bits of the pseudo random sequence may be pre-calculated in a single time step. Referring to the example illustrated in FIG. 1, the output of flip-flop 10 at a current time step t, $Q_{0,t}$ may be represented relative to the output of the other flip-flops at a previous time step t-1 as $$Q_{0,t}=(G_0*Q_{0,t-1}) \text{ xor } (G_1*Q_{0,t-1}) \text{ xor } \ldots \text{ xor } (G_{L-1}*Q_{L-1,t-1}). \quad (1)$$

All other outputs of the of the other flip-flops at time step t may be represented relative to the output of a higher order flip-flop at a previous time step t-1 by shifting the sequence, i.e., $$Q_{x,t}=Q_{x-1,t-1} \text{ for } x=1 \text{ to } L-1. \quad (2)$$

Similarly, the output of flip-flop 110 at time step t-1, $Q_{0,t-1}$, may be represented relative to the output of the other flip-flops at a previous time step t-2 as $$Q_{0,t-1}=(G_0*Q_{0,t-2}) \text{ xor } (G_1*Q_{0,t-2}) \text{ xor } \ldots \text{ xor } (G_{L-1}*Q_{L-1,t-2}). \quad (3)$$

Likewise, the other outputs of the of the other flip-flops at time step t-1 may be represented relative to the output of a higher order flip-flop at a previous time step t-2 by shifting the sequence, i.e., $$Q_{x,t-1}=Q_{x-1,t-2} \text{ for } x=1 \text{ to } L-1. \quad (4)$$

The outputs of the flip-flop at a current time step t may be represented relative to the outputs of the flip-flops at time step t-2 by replacing all elements with index t-1 in equations (1) and (2) with the corresponding elements calculated with equations (3) and (4). The same method may be re-applied to determine the relationship of the outputs of the flip-flops at time step t depending on their values at any time t-k, where k is an integer >0. The resulting relationships may be used to design a multi-step PRS generator by connecting the outputs of the flip-flops accordingly. The multi-step PRS generator of length L may generate up to L values in a single time step without requiring additional flip-flops or additional storage.

Figure 2:
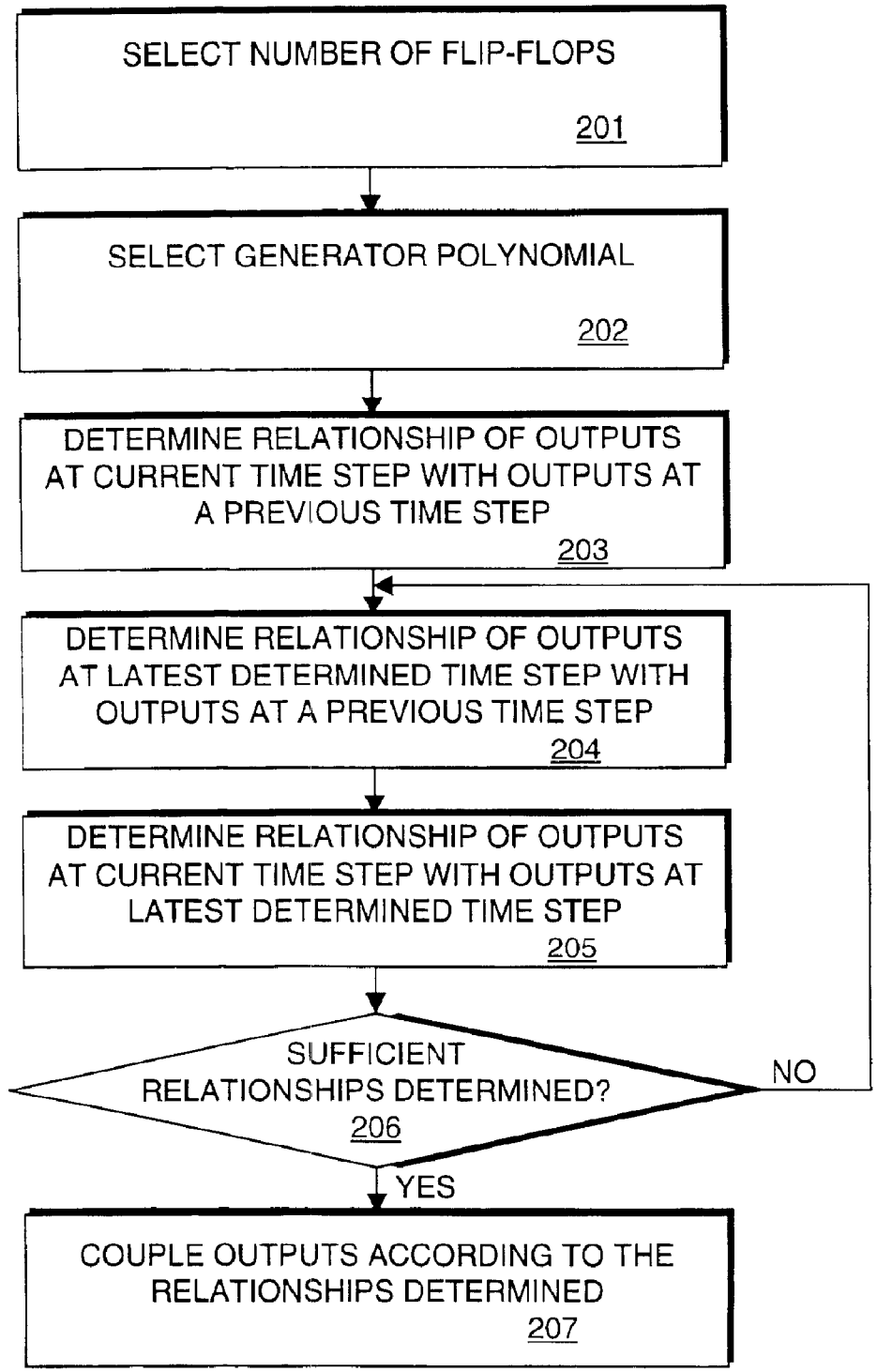
FIG. 2 is a flow chart that illustrates a method for implementing a multi-step pseudo random sequence generator according to an embodiment of the present invention.

FIG. 2 is a flow chart illustrating a method for implementing a multi-step PRS generator according to an embodiment of the present invention. At step 201 a number of flip-flops, L, is selected for an initial model PRS generator. The initial model PRS generator is an initial model from which a multi-step PRS generator may be architected. According to an embodiment of the present invention, the number of flip-flops selected may be based on a desired length of a code sequence to be generated and/or a number of coefficients of the code sequence desired to be generated per time step by the multi-step PRS generator.

At step 202, a generator polynomial for the initial model PRS generator is selected. According to an embodiment of the present invention, each flip-flop in the initial model PRS generator has a corresponding generator polynomial. The generator polynomial determines whether an output of a flip-flop will be utilized in deriving a feedback loop back into the lowest order flip-flop in the initial model PRS generator.

At step 203, the relationship between outputs of the flip-flops at a current time step, t, with the output of the flip-flops at a previous time step, t-1, is determined.

At step 204, the relationship between the outputs of the flip-flops at the latest determined time step with the output of the flip-flops at a previous time step is determined.

At step 205, the relationship between outputs of the flip-flops at the current time step, t, with the outputs of the flip-flops at the latest determined time step is determined.

At step 206, it is determined whether the relationships determined are sufficient. According to an embodiment of the present invention, the relationships determined are sufficient if the time step differential between the latest determined time step and the current time step, t, is equal to the number of values desired to be generated per clock cycle. If the determined relationships are sufficient, control proceeds to step 207. If the determined relationships are not sufficient, control proceeds to step 204.

At step 207, a multi-step PRS generator is constructed by coupling the flip-flops according to the relationships determined.

FIG. 2 illustrates a flow chart describing a method for implementing a multi-step PRS generator according to an embodiment of the present invention. Some of the steps illustrated in this figure may be performed sequentially, in parallel or in an order other than that which is described. It should be appreciated that not all of the steps described are required to be performed, that additional steps may be added, and that some of the illustrated steps may be substituted with other steps.

Examples of how to implement a multi-step PRS generator is shown in FIGS. 3–6 with the aid of FIG. 2. In these examples, a 15 value pseudo random sequence is desired. It is also desired to generate samples at the rate of two, three, and four values per time step. Thus, at step 201, four is selected as the number of flip-flops for the multi-step PRS generator. Four flip-flops allow the PRS generator to generate a 15 value pseudo random sequence and to generate a maximum of four values per time step.

Figure 3:
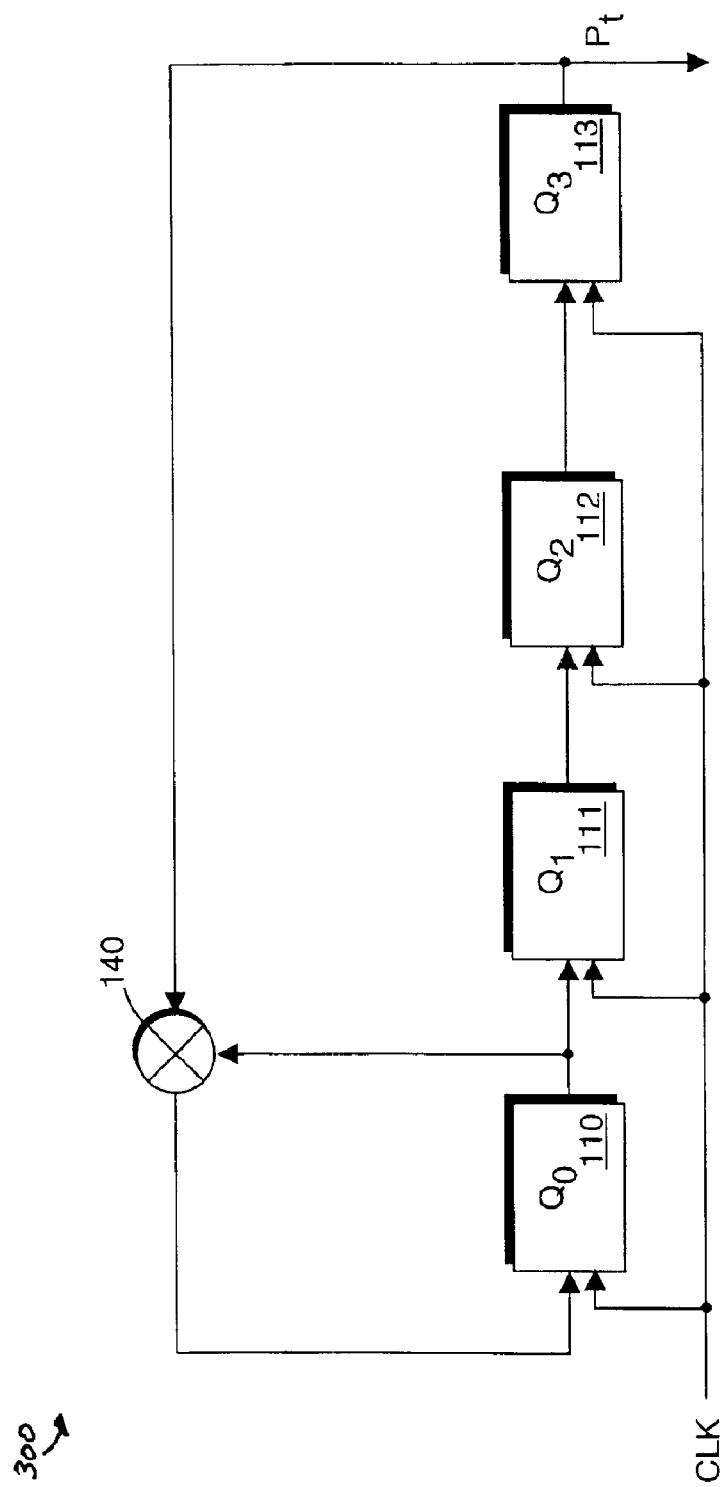
FIG. 3 is a block diagram illustrating a single step pseudo random sequence generator according to an embodiment of the present invention.

At step 202, a generator polynomial of 1001 ($G_0=1, G_1=0, G_1=0, G_3=1$) is selected. This generator polynomial defines a feedback that includes utilizing the outputs from the highest order flip-flop and the fourth highest order flip-flop. According to an embodiment of the present invention, the outputs of the highest order and fourth highest order flip-flops are XORed together and fed back to the highest order flip-flop. FIG. 3 illustrates a block diagram of an initial model PRS generator: 300. The initial model PRS generator 300 may be an implementation of the initial model PRS generator 100 shown in FIG. 1 where the generator polynomial, G, is selected to be 1001 ($G_0=1, G_1=0, G_2=0, G_3=1$). In the embodiment shown in FIG. 3, the values $G_0$, $G_1$, $G_2$, and $G_3$ are fixed such that circuits that perform an AND function are not implemented.

At step 203, the relationships between the outputs of the flip-flops at a current time step, t, and outputs of the flip-flops at a previous time step, t-1, is determined. From FIG. 2, the relationships between $Q_{0,t}$, $Q_{1,t}$, $Q_{2,t}$, $Q_{3,t}$ and $Q_{0,t-1}$, $Q_{1,t-1}$, $Q_{2,t-1}$, $Q_{3,t-1}$ are determined to be:

$$Q_{0,t}=Q_{0,t-1} \text{ xor } Q_{3,t-1}; \tag{5}$$

$$Q_{1,t}=Q_{0,t-1}; \tag{6}$$

$$Q_{2,t}=Q_{1,t-1}; \text{ and} \tag{7}$$

$$Q_{3,t}=Q_{2,t-1}. \tag{8}$$

At step 204, the relationships between the outputs of the flip-flops at the latest determined time step, t-1, and a previous time step, t-2, is determined. From FIG. 2, the relationships between $Q_{0,t-1}$, $Q_{1,t-1}$, $Q_{2,t-1}$, $Q_{3,t-1}$ and $Q_{0,t-2}$, $Q_{1,t-2}$, $Q_{2,t-2}$, $Q_{3,t-2}$ are determined to be:

$$Q_{0,t-1}=Q_{0,t-2} \text{ xor } Q_{3,t-2}; \tag{9}$$

$$Q_{1,t-1}=Q_{0,t-2}; \tag{10}$$

$$Q_{2,t-1}=Q_{1,t-2}; \text{ and} \tag{11}$$

$$Q_{3,t-1}=Q_{2,t-2} \tag{12}$$

At step 205, the relationships between the outputs at the current time step, t, and the outputs of the flip-flops at the latest determined time step, t-2, is determined. By substituting equations (9) and (12) into (5), the following relationship is determined.

$$Q_{0,t}=Q_{0,t-2} \text{ xor } Q_{3,t-2} \text{ xor } Q_{2,t-2} \tag{13}$$

By substituting equation (9) into (6), the following relationship is determined.

$$Q_{1,t-1}=Q_{0,t-2} \text{ xor } Q_{3,t-2} \tag{14}$$

By substituting equation (10) into (7), the following relationship is determined.

$$Q_{2,t}=Q_{0,t-2} \tag{15}$$

By substituting equation (11) into (8), the following relationship is determined.

$$Q_{3,t}=Q_{1,t-2} \tag{16}$$

At step 206, it is determined that the time step differential between the latest determined time step, t-2, and the current time step, t, is two. Thus, the relationships determined in equations (5)–(16) are sufficient for architecting a multi-step PRS generator that outputs two values per clock cycle.

At step 207, a multi-step PRS generator that generates two values per clock cycle is constructed by coupling the flip-flops according to the relationships determined in equations (13)–(16). Since the relationships are derived for a multi-step generator that processes two values per time step, the time reference t and t-2 may be represented using the notation u and u-1. respectively. Thus, equations (13)–(16) may be represented with the following equations (17)–(20), respectively.

$$Q_{0,u}=Q_{0,u-1} \text{ xor } Q_{3,u-1} \text{ xor } Q_{2,u-1} \tag{17}$$

$$Q_{1,u}=Q_{0,u-1} \text{ xor } Q_{3,u-1} \tag{18}$$

$$Q_{2,u}=Q_{0,u-1} \tag{19}$$

$$Q_{3,u}=Q_{1,u-1} \tag{20}$$

Figure 4:
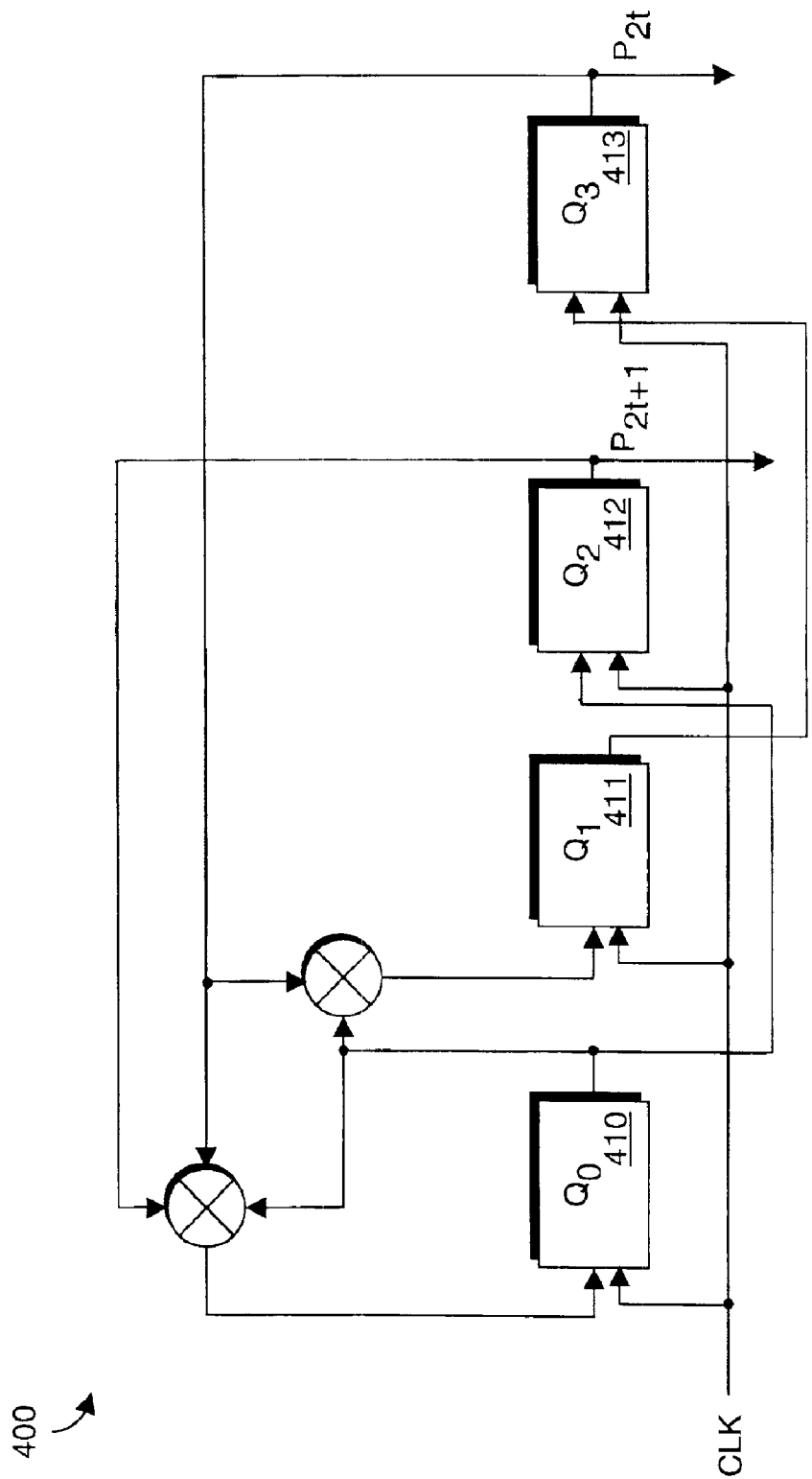
FIG. 4 illustrates an exemplary multi-step pseudo random sequence generator that generates 2 coefficients per time step according to an embodiment of the present invention.

FIG. 4 illustrates a block diagram of a multi-step PRS generator 400 constructed from the relationships derived in equations (17)–(20). Equation (17) indicates that the output of the highest order flip-flop 410 is dependent on the output of the highest order flip-flop 410 XORed with the outputs of the fourth highest order flip-flop 413, and the third highest order flip-flop 412 at the previous. time step. Equation (18) indicates that the output of the second highest order flip-flop 411 is dependent on the output of the highest order flip-flop 410 XORed with the output of the fourth highest order flip-flop 413 at the previous time step. Equation (19) indicates that the output of the third highest order flip-flop 412 is dependent on the output of the highest order flip-flop 410 at the previous time step. Equation (20) indicates that the output of the fourth highest order flip-flop 413 is dependent on the output of the second highest order flip-flop 411 at a previous time step. The multi-step PRS generator 400 outputs a first value from a pseudo random sequence, $p_{2t}$, at the output of flip-flop 413 and a second value from the pseudo random sequence, $p_{2t+1}$, at the output of flip-flop 412 at each clock cycle.

Referring back to step 206 shown in FIG. 2, the relationships determined are not sufficient for architecting a multi-step PRS generator that generates more than two values per clock cycle. Thus, control proceeds to step 204.

At step 204, the relationships between the outputs of the flip-flops at the latest determined time step, t-2, and a previous time step, t-3, is determined. From FIG. 2, the relationships between $Q_{0,t-2}$, $Q_{1,t-2}$, $Q_{2,t-2}$, $Q_{3,t-2}$ and $Q_{0,t-3}$, $Q_{1,t-3}$, $Q_{2,t-3}$, $Q_{3,t-3}$ are determined to be:

$$Q_{0,t-2} = Q_{0,t-3} \text{ xor } Q_{3,t-3}; \quad (21)$$

$$Q_{1,t-2} = Q_{0,t-3}; \quad (22)$$

$$Q_{2,t-2} = Q_{1,t-3}; \text{ and} \quad (23)$$

$$Q_{3,t-2} = Q_{2,t-3}. \quad (24)$$

At step 205, the relationships between the outputs at the current time step, t, and the outputs of the flip-flops at the latest determined time step, t-3, is determined. By substituting equations (21), (23), and (24) into (13), the following relationship is determined.

$$Q_{0,t} = Q_{0,t-3} \text{ xor } Q_{3,t-3} \text{ xor } Q_{2,t-3} \text{ xor } Q_{1,t-3} \quad (25)$$

By substituting equation (21) and (24) into (14), the following relationship is determined.

$$Q_{1,t} = Q_{0,t-3} \text{ xor } Q_{3,t-3} \text{ xor } Q_{2,t-3} \quad (26)$$

By substituting equation (21) into (15), the following relationship is determined.

$$Q_{2,t} = Q_{0,t-3} \text{ xor } Q_{3,t-3} \quad (27)$$

By substituting equation (22) into (16), the following relationship is determined.

$$Q_{3,t} = Q_{0,t-3} \quad (28)$$

At step 206, it is determined that the time step differential between the latest determined time step, t-3, and the current time step, t, is three. Thus, the relationships determined in equations (5)–(28) are sufficient for architecting a multi-step PRS generator that outputs three values per clock cycle.

At step 207, a multi-step PRS generator that generates three values per clock cycle is constructed by coupling the flip-flops according to the relationships determined in equations (25)–(28). Since the relationships are derived for a multi-step generator that processes three values per time step, the time reference t and t-3 may be represented using the notation u and u-1, respectively. Thus, equations (25)–(28) may be represented with the following equations (29)–(32), respectively.

$$Q_{0,u} = Q_{0,u-1} \text{ xor } Q_{3,u-1} \text{ xor } Q_{3,u-1} \text{ xor } Q_{2,u-1} \quad (29)$$

$$Q_{1,u} = Q_{0,u-1} \text{ xor } Q_{3,u-1} \text{ xor } Q_{2,u-1} \quad (30)$$

$$Q_{2,u} = Q_{0,u-1} \text{ xor } Q_{3,u-1} \quad (31)$$

$$Q_{3,u} = Q_{0,u-1} \quad (32)$$

Figure 5:
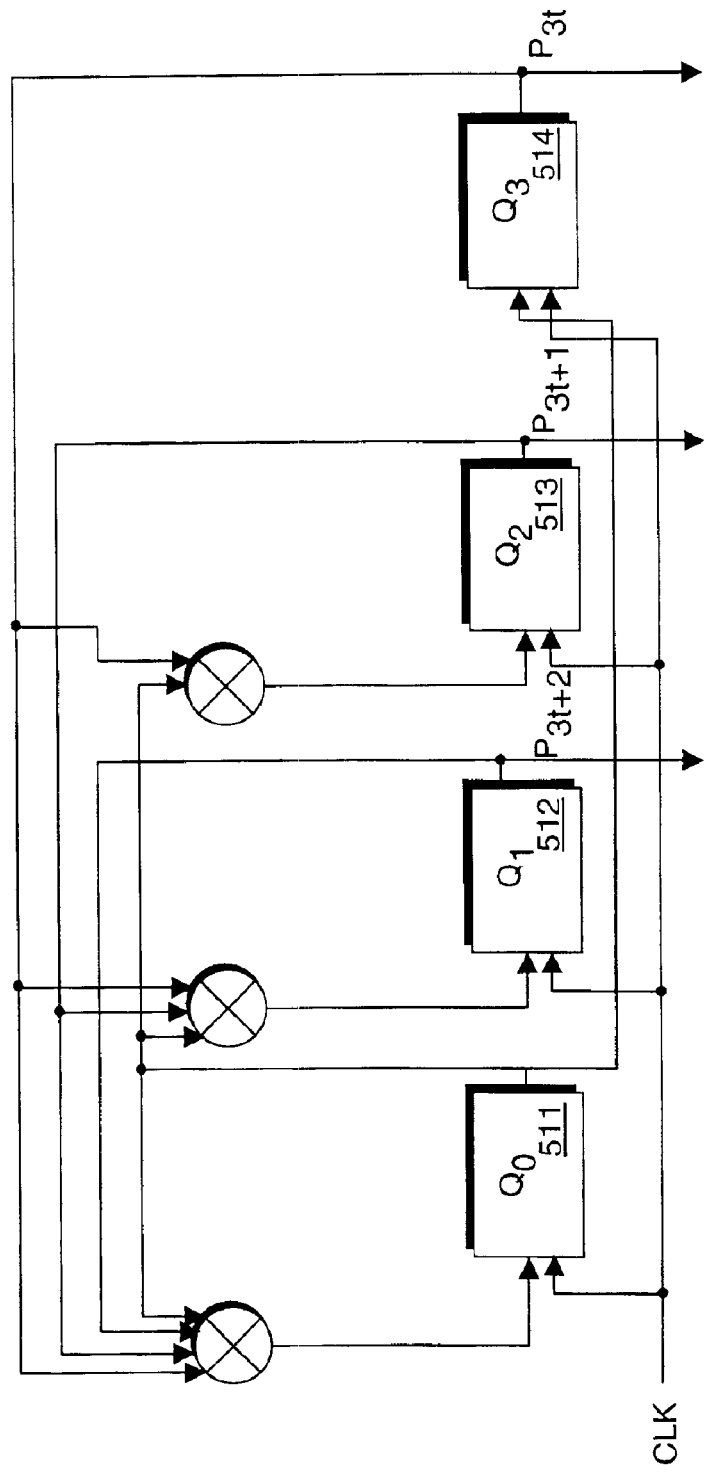
FIG. 5 illustrates an exemplary multi-step pseudo random sequence generator that generates 3 coefficients per time step according to an embodiment of the present invention.

FIG. 5 illustrates a block diagram of a multi-step PRS generator 500 constructed from the relationships derived in equations (29)–(32). Equation (29) indicates that the output of the highest order flip-flop 510 is dependent on the output of the highest order flip-flop 510 XORed with the outputs of the fourth highest order flip-flop 513, the third highest order flip-flop 512, and the second highest order flip-flop 511 at the previous time step. Equation (30) indicates that the output of the second highest order flip-flop 511 is dependent on the output of the highest order flip-flop 510 XORed with the output of the fourth highest order flip-flop 513 and the third highest order flip-flop 512 at the previous time step. Equation (31) indicates that the output of the third highest order flip-flop 512 is dependent on the output of the highest order flip-flop 510 XORed with the output of the fourth highest order flip-flop 513 at the previous time step. Equation (32) indicates that the output of the fourth highest order flip-flop 513 is dependent on the output of the highest order flip-flop 510 at a previous time step. The multi-step PRS generator 500 outputs a first, second, and third value from a pseudo random sequence, $p_{3t}$, $p_{3t+1}$, $p_{3t+2}$, at the output of flip-flops 513, 512, and 511, respectively, at each clock cycle.

Referring back to step 206 shown in FIG. 2, the relationships determined are not sufficient for architecting a multi-step PRS generator that generates more than three values per clock cycle. Thus, control proceeds to step 204.

At step 204, the relationships between the outputs of the flip-flops at the latest determined time step, t-3, and a previous time step, t-4, is determined. From FIG. 2, the relationships between $Q_{0,t-3}$, $Q_{1,t-3}$, $Q_{2,t-3}$, $Q_{3,t-3}$ and $Q_{0,t-4}$, $Q_{1,t-4}$, $Q_{2,t-4}$, $Q_{3,t-4}$ are determined to be:

$$Q_{0,t-3} = Q_{0,t-4} \text{ xor } Q_{3,t-4}; \quad (33)$$

$$Q_{1,t-3} = Q_{0,t-4}; \quad (34)$$

$$Q_{2,t-3} = Q_{1,t-4}; \text{ and} \quad (35)$$

$$Q_{3,t-3} = Q_{2,t-4}. \quad (36)$$

At step 205, the relationships between the outputs at the current time step, t, and the outputs of the flip-flops at the latest determined time step, t-4, is determined. By substituting equations (33), (36), (35), and (34) into (25), the following relationship is determined.

$$Q_{0,t} = Q_{3,t-4} \text{ xor } Q_{2,t-3} \text{ xor } Q_{1,t-3} \quad (37)$$

By substituting equation (33), (36), and (35) into (26), the following relationship is determined.

$$Q_{1,t} = Q_{0,t-4} \text{ xor } Q_{3,t-4} \text{ xor } Q_{2,t-4} \text{ xor } Q_{1,t-4} \quad (38)$$

By substituting equation (33) and (36) into (27), the following relationship is determined.

$$Q_{2,t} = Q_{0,t-4} \text{ xor } Q_{3,t-4} \text{ xor } Q_{2,t-4} \quad (39)$$

By substituting equation (33) into (28), the following relationship is determined.

$$Q_{3,t} = Q_{0,t-4} \text{ xor } Q_{3,t-4} \quad (40)$$

At step 206, it is determined that the time step differential between the latest determined time step, t-4, and the current time step, t, is four. Thus, the relationships determined in equations (5)–(40) are sufficient for architecting a multi-step PRS generator that outputs four values per clock cycle.

At step 207, a multi-step PRS generator that generates three values per clock cycle is constructed by coupling the flip-flops according to the relationships determined in equations (37)–(40). Since the relationships are derived for a multi-step generator that processes four values per time step, the time reference t and t-4 may be represented using the notation u and u-1, respectively. Thus, equations (37)–(40) may be represented with the following equations (41)–(44), respectively.

$$Q_{0,u} = Q_{3,u-1} \text{ xor } Q_{2,u-1} \text{ xor } Q_{1,u-1} \quad (41)$$

$$Q_{1,u} = Q_{0,u-1} \text{ xor } Q_{3,u-1} \text{ xor } Q_{2,u-1} \text{ xor } Q_{1,u-1} \quad (42)$$

$$Q_{2,u} = Q_{0,u-1} \text{ xor } Q_{3,u-1} \text{ xor } Q_{2,u-1} \quad (43)$$

$$Q_{3,u} = Q_{0,u-1} \text{ xor } Q_{3,u-1} \quad (44)$$

Figure 6:
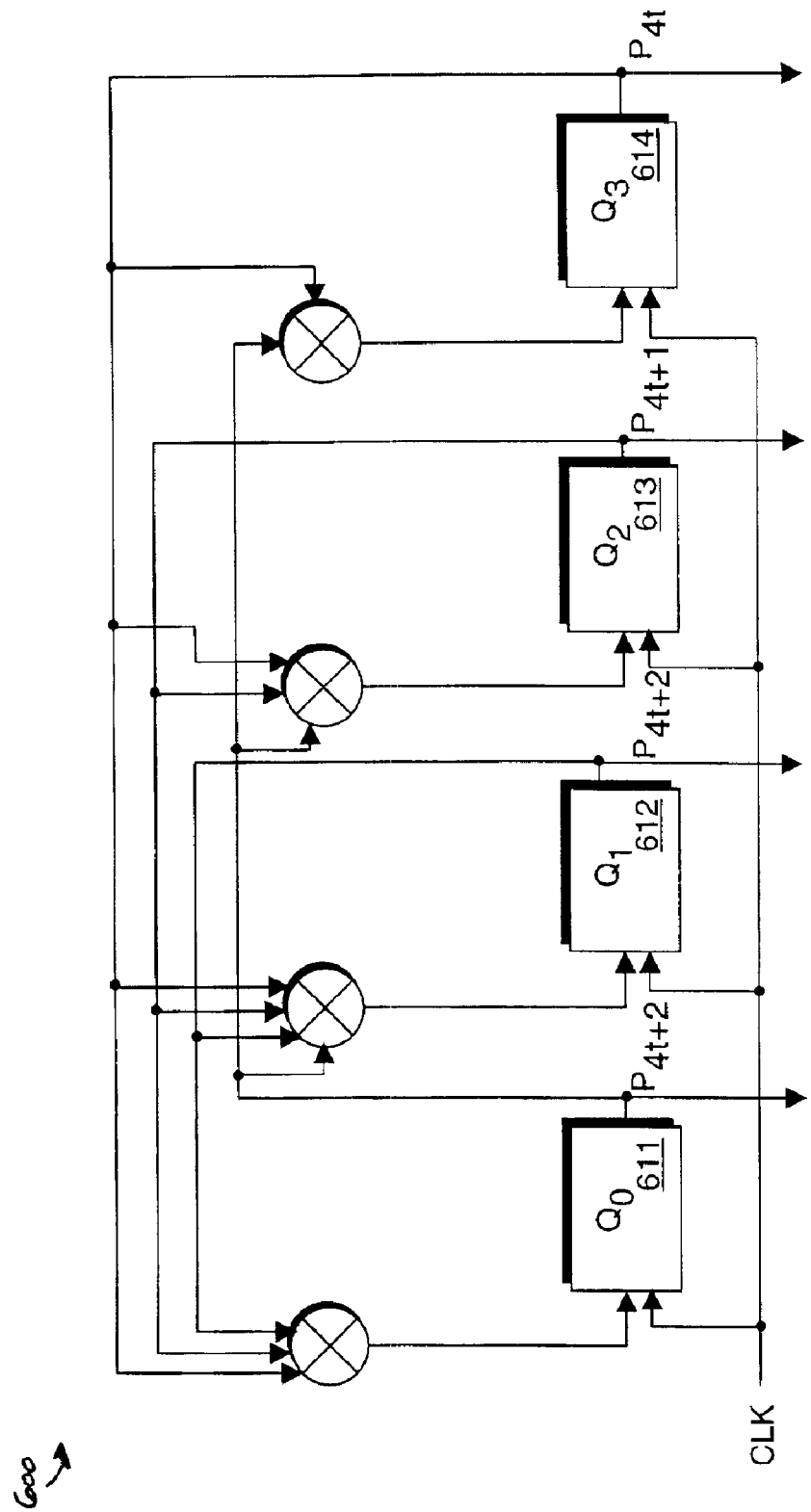
FIG. 6 illustrates an exemplary multi-step pseudo random sequence generator that generates 4 coefficients per time step according to an embodiment of the present invention.

FIG. 6 illustrates a block diagram of a multi-step PRS generator 600 constructed from the relationships derived in equations (41)–(44). Equation (41) indicates that the output of the highest order flip-flop 610 is dependent on the output of the fourth highest order flip-flop 613 XORed with the output of the third highest order flip-flop 612 and the second highest order flip-flop 611 at the previous time step. Equation (42) indicates that the output of the second highest order flip-flop 611 is dependent on the output of the highest order flip-flop 610 XORed with the output of the fourth highest order flip-flop 613, the third highest order flip-flop 512, and the second highest order flip-flip 611 at the previous time step. Equation (43) indicates that the output of the third highest order flip-flop 612 is dependent on the output of the highest order flip-flop 610 XORed with the output of the fourth highest order flip-flop 613 and the output of the third highest order flip-flop 612 at the previous time step. Equation (44) indicates that the output of the fourth highest order flip-flop 613 is dependent on the output of the highest order flip-flop 610 XORed with the output of the fourth highest order flip-flop 613 at the previous time step. The multi-step PRS generator 600 outputs a first, second, third, and fourth value from a pseudo random sequence, $p_{4t}$, $p_{4t+1}$, $p_{4t+2}$, $p_{4t+2}$, at the output of flip-flops 613, 612, 611, and 612 respectively, at each clock cycle.

FIGS. 4–6 illustrate examples of multi-step PRS generators with four flip-flops having a generator polynomial of 1001. It should be appreciated, however, that the present invention may be implemented with any number of flip-flops or other memory elements and with other generator polynomials. According to an embodiment of the present invention, a multi-step polynomial generator having at least four flip-flops includes a first flip-flop having an output $Q_{0,u}$ and a generator polynomial $G_0$, a second flip-flop having an output $Q_{1,u}$ and a generator polynomial $G_1$, a third flip-flop having an output $Q_{2,u}$ and a generator polynomial $G_2$, and a fourth flip-flop having an output $Q_{3,u}$ and a generator polynomial $G_3$. An input of the first flip-flop is coupled to the PRS generator such that the output $Q_{0,u}$ is generated in response to $G0*[G_0*Q_{0,u-1}$ XOR $G_1*Q_{1,u-1}$ XOR $G_2*Q_{2,u-1}$ XOR $G_3*Q_{3,u-1}]$ XOR $G_1*Q_{0,u-1}$ XOR $G_2*Q_{1,u-1}$ XOR $G_3*Q_{2,u-1}$. An input to the second flip-flop is coupled to the PRS generator such that the output $Q_{1,u}$ is generated in response to $G_0*Q_{0,u-1}$ XOR $G_1*Q_{1,u-1}$ XOR $G_2*Q_{2,u-1}$ XOR $G_3*Q_{3,u-1}$. An input to the third flip-flop coupled to the PRS generator such that the output $Q_{2,u}$ is generated in response to $Q_{0,u-1}$. These relationships are derived from equations (1)–(4).

If the multi-step PRS generator processes three coefficients per time step, the input of the first flip-flop is coupled to the PRS generator such that the output $Q_{0,u}$ is further generated in response to $G_1*[G_0*Q_{0,u-1}$ XOR $G_1*Q_{1,u-1}$ XOR $G_2*Q_{2,u-1}$ XOR $G_3*Q_{3,u-1}]$ XOR $G_2*Q_{0,u-1}$ XOR $G_3*Q_{1,u-1}$. The input of the second flip-flop is coupled to the PRS generator such that the output $Q_{1,u}$ is further generated in response to $G_1*Q_{0,u-1}$ XOR $G_2*Q_{1,u-1}$ XOR $G_3*Q_{2,u-1}$. The input of the third flip-flop is coupled to the PRS generator such that the output $Q_{2,u}$ is further generated in response to $G_1*Q_{1,u-1}$ XOR $G_2*Q_{2,u-1}$ XOR $G_3*Q_{3,u-1}$. These relationships are derived from re-applying equations (3)–(4) a second time to calculate values at a previous time step.

If the multi-step PRS generator processes four coefficients per time step, the input of the first flip-flop is coupled to the PRS generator such that the output $Q_{0,u}$ is further generated in response to $G_1*Q_{0,u-1}$ XOR $G_2*Q_{1,u-1}$ XOR $G_3*Q_{2,u-1}$ XOR $G_2*[G_0*Q_{0,u-1}$ XOR $G_1*Q_{1,u-1}$ XOR $G_2*Q_{2,u-1}$ XOR $G_3*Q_{3,u-1}]$ XOR $G_0*Q_{1,u-1}$. The input of the second flip-flop is coupled to the PRS generator such that the output $Q_{1,u}$ is further generated in response to $G_1*[G_0*Q_{0,u-1}$ XOR $G_1*Q_{1,u-1}$ XOR $G_2*Q_{2,u-1}$ XOR $G_3*Q_{3,u-1}]$ XOR $G_2*Q_{0,u-1}$ XOR $G_3*Q_{1,u-1}$. The input of the third flip-flop is coupled to the PRS generator such that the output $Q_{2,u}$ is further generated in response to $G_1*Q_{0,u-1}$ XOR $G_2*Q_{1,u-1}$ XOR $G_2*Q_{3,u-1}$. These relationships are derived from re-applying equations (3)–(4) a third time to calculate values a next previous time step. It should be appreciated that equations (3)–(4) may be re-applied up to L−1 times to generate relationships for architecting a multi-step PRS generator.

The multi-step PRS generator described allows multiple bits in a pseudo random sequences to be generated in a single time step using a reduced number of hardware resources. Thus, a larger number of multiply and accumulate operations may be performed on a given device. This allows the correlation process to speed up significantly and translates to faster signal acquisition times and a decrease in delay of the control loop used for tracking a signal.

In the foregoing specification the invention has been described with reference to specific exemplary embodiments thereof. It will, however, be evident that various modifications and charges may be thereto without departing from the broader spirit and scope of the invention. The Specification and drawings are, accordingly, to be regarded in an illustrative rather than restrictive sense.

What is claimed is:

1. A method for implementing a multi-step pseudo random sequence (PRS) generator, comprising:
   determining relationships between outputs of flip-flops of an initial model PRS generator at a current time step t with the outputs of the flip-flops at a time step t-n, where n is a number of coefficients to be generated per time step; and
   coupling flip-flops in the multi-step PRS generator in response to the relationships between the outputs of the flip-flops at the current time step t with the outputs of the flip-flops at the time step t-n.

2. The method of claim 1, further comprising the step of selecting a number of flip-flops, L, based on a length of the code sequence and a number of coefficients of the code sequence to be generated per time step.

3. The method of claim 1, further comprising the step of selecting a generator polynomial for the initial model PRS generator.

4. The method of claim 1, wherein determining the relationships between the outputs of the flip-flops of the initial model PRS generator at the current time step t with the outputs of the flip-flops at the time step t-n comprises:
   determining relationships between outputs of the flip-flops at a current time step t with the outputs of the flip-flops at a time step t-1;
   determining relationships between the outputs the flip-flops at the time step t-1 with the outputs of the flip-flops at a time step t-2; and
   determining relationships between the outputs of the flip-flops at the current time step t with the outputs of the flip-flops at the time step t-2.

5. The method of claim 4, wherein determining the relationships between the outputs of the flip-flops of the initial model PRS generator at the current time step t with the output of the flip-flops at the time step t-n further comprises:
   determining relationships between the outputs the flip-flops at the time step t-2 with the outputs of the flip-flops at a time step t-3; and determining relationships between the outputs of the flip-flops at the current time step t with the outputs of the flip-flops at the time step t-3.

6. The method of claim 5, wherein determining the relationships between the outputs of the flip-flops of the initial model PRS generator at the current time step t with the output of the flip-flops at the time step t-n further comprises:

determining relationships between the outputs the flip-flops at the time step t-3 with the outputs of the flip-flops at a time step t-4; and determining relationships between the outputs of the flip-flops at the current time step t with the outputs of the flip-flops at the time step t-4.

7. The method of claim 6, wherein determining the relationships between the outputs of the flip-flops of the initial model PRS generator at the current time step t with the output of the flip-flops at the time step t-n further comprises:

determining relationships between the outputs the flip-flops at the time step t-4 with the outputs of the flip-flops at a time step t-5; and determining relationships between the outputs of the flip-flops at the current time step t with the outputs of the flip-flops at the time step t-5.

8. A method for implementing a multi-step pseudo random sequence (PRS) generator, comprising:

selecting a number of flip-flops for an initial model PRS generator, L, based on a length of the code sequence and a number of coefficients of the code sequence to be generated per time step;

selecting a generator polynomial for the initial model PRS generator;

determining relationships between outputs of the flip-flops at a current time step t with the outputs of the flip-flops at a time step t-1;

determining relationships between the outputs the flip-flops at the time step t-1 with the outputs of the flip-flops at a time step t-2;

determining relationships between the outputs of the flip-flops at the current time step t with the outputs of the flip-flops at the time step t-2; and coupling flip-flops in the multi-step PRS generator in response to the relationships between the outputs of the flip-flops at the current time step t with the outputs of the flip-flops at the time step t-2.

9. A multi-step pseudo random sequence (PRS) generator, comprising:

a first flip-flop having an output $Q_{0,u}$ and a generator polynomial $G_0$;

a second flip-flop having an output $Q_{1,u}$ and a generator polynomial $G_1$;

a third flip-flop having an output $Q_{2,u}$ and a generator polynomial $G_2$;

a fourth flip-flop having an output $Q_{3,u}$ and a generator polynomial $G_3$;

an input of the first flip-flop coupled the PRS generator such that the output $Q_{0,u}$ is generated in response to $G0*[G_0*Q_{0,u-1}$XOR $G_1*Q_{1,u-1}$ XOR $G_2*Q_{2,u-1}$ XOR $G_3*Q_{3,u-1}$]XOR $G_1*Q_{0,u-1}$ XOR $G_2*Q_{1,u-1}$ XOR $G_3*Q_{2,u-1}$;

an input to the second flip-flop coupled to the PRS generator such that the output $Q_{1,u}$ is generated in response to $G_0*Q_{0,u-1}$ XOR $G_1*Q_{1,u-1}$ XOR $G_2*Q_{2,u-1}$ XOR $G_3*Q_{3,u-1}$; and an input to the third flip-flop coupled to the PRS generator such that the output $Q_{2,u}$ is generated in response to $Q_{0,u-1}$.

10. The multi-step PRS generator of claim 9, further comprising an input to the fourth flip-flop coupled to the PRS generator such that the output $Q_{3,u}$ is generated in response to $Q_{1,u-1}$.

11. The multi-step PRS generator of claim 9, wherein the input of the first flip-flop is coupled to the PRS generator such that the output $Q_{0,u}$ is further generated in response to $G_1*[G_0*Q_{0,u-1}$XOR $G_1*Q_{1,u-1}$ XOR $G_2*Q_{2,u-1}$ XOR $G_3*Q_{3,u-1}$]XOR $G_2*Q_{0,u-1}$ XOR $G_3*Q_{1,u-1}$.

12. The multi-step PRS generator of claim 9, wherein the input of the second flip-flop is coupled to the PRS generator such that the output $Q_{1,u}$ is further generated in response to $G_1*Q_{0,u-1}$ XOR $G_2*Q_{1,u-1}$ XOR $G_3*Q_{2,u-1}$.

13. The multi-step PRS generator of claim 9, wherein the input of the third flip-flop is coupled to the PRS generator such that the output $Q_{2,u}$ is further generated in response to $G_1*Q_{1,u-1}$ XOR $G_2*Q_{2,u-1}$ XOR $G_3*Q_{3,u-1}$.

14. The multi-step PRS generator of claim 9, further comprising an input to the fourth flip-flop coupled to the PRS generator such that the output $Q_{3,u}$ is generated in response to $Q_{0,u-1}$.

15. The multi-step PRS generator of claim 11, wherein the input of the first flip-flop is coupled to the PRS generator such that the output $Q_{0,u}$ is further generated in response to $G_1*Q_{0,u-1}$ XOR $G_2*Q_{1,u-1}$ XOR $G_3*Q_{2,u-1}$ XOR $G_2*[G_0*Q_{0,u-1}$XOR $G_1*Q_{1,u-1}$ XOR $G_2*Q_{2,u-1}$ XOR $G_3*Q_{3,u-1}$] XOR $G_0*Q_{1,u-1}$.

16. The multi-step PRS generator of claim 12, wherein the input of the second flip-flop is coupled to the PRS generator such that the output $Q_{1,u}$ is further generated in response to $G_1*[G_0*Q_{0,u-1}$XOR $G_1*Q_{1,u-1}$ XOR $G_2*Q_{2,u-1}$ XOR $G_3*Q_{3,u-1}$]XOR $G_2*Q_{0,u-1}$ XOR $G_3*Q_{1,u-1}$.

17. The multi-step PRS generator of claim 13, wherein the input of the third flip-flop is coupled to the PRS generator such that the output $Q_{2,u}$ is further generated in response to $G_1*Q_{0,u-1}$ XOR $G_2*Q_{1,u-1}$ XOR $G_2*Q_{3,u-1}$.

18. The multi-step PRS generator of claim 9, further comprising an input to the fourth flip-flop coupled to the PRS generator such that the output $Q_{3,u}$ is generated in response to $G_0*Q_{0,u-1}$ XOR $G_1*Q_{1,u-1}$ XOR $G_2*Q_{2,u-1}$ XOR $G_3*Q_{3,u-1}$.

19. The multi-step PRS generator of claim 9, further comprising a fifth flip-flop having an output $Q_{4,u}$ and a generator polynomial $G_4$.

20. The multi-step PRS generator of claim 19, further comprising an input to the fifth flip-flop coupled to the PRS generator such that the output $Q_{4,u}$ is generated in response to $Q_{2,u-1}$.

21. The multi-step PRS generator of claim 19, further comprising an input to the fifth flip-flop coupled to the PRS generator such that the output $Q_{4,u}$ is generated in response to $Q_{1,u-1}$.

22. The multi-step PRS generator of claim 19, further comprising an input to the fifth flip-flop coupled to the PRS generator such that the output $Q_{4,u}$ is generated in response to $Q_{0,u-1}$.

23. The multi-step PRS generator of claim 19, further comprising an input to the fifth flip-flop coupled to the PRS generator such that the output $Q_{4,u}$ is generated in response to $G_0*Q_{0,u-1}$ XOR $G_1*Q_{1,u-1}$ XOR $G_2*Q_{2,u-1}$ XOR $G_3*Q_{3,u-1}$.

* * * * *